United States Patent
Okita (10) Patent No.: US 9,483,045 B2
(45) Date of Patent: Nov. 1, 2016

(54) NUMERICAL CONTROLLER

(71) Applicant: FANUC Corporation, Minamitsuru-gun, Yamanashi (JP)

(72) Inventor: Hiroshi Okita, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 14/641,661

(22) Filed: Mar. 9, 2015

(65) Prior Publication Data
US 2015/0261205 A1 Sep. 17, 2015

(30) Foreign Application Priority Data
Mar. 11, 2014 (JP) ................................. 2014-047860

(51) Int. Cl.
- G08B 23/00 (2006.01)
- G05B 19/408 (2006.01)
- G05B 19/406 (2006.01)

(52) U.S. Cl.
CPC ........... *G05B 19/408* (2013.01); *G05B 19/406* (2013.01); *G05B 2219/34361* (2013.01)

(58) Field of Classification Search
None
See application file for complete search history.

(56) References Cited

U.S. PATENT DOCUMENTS

| | | | | |
|---|---|---|---|---|
| 4,843,541 A | * | 6/1989 | Bean | G06F 9/5077 710/262 |
| 6,606,677 B1 | * | 8/2003 | Okbay | G06F 13/24 710/260 |
| 2002/0055790 A1 | * | 5/2002 | Havekost | G05B 23/027 700/80 |
| 2003/0128979 A1 | * | 7/2003 | Kitajima | H04B 10/0793 398/12 |
| 2008/0208373 A1 | * | 8/2008 | Thurau | G05B 23/027 700/80 |
| 2010/0164708 A1 | * | 7/2010 | Maeji | G06F 11/0772 340/521 |
| 2012/0069970 A1 | * | 3/2012 | Unger | H04M 3/08 379/32.02 |
| 2012/0275473 A1 | * | 11/2012 | Yamamoto | H04J 3/0688 370/496 |

FOREIGN PATENT DOCUMENTS

JP 2009-104246 A 5/2009

* cited by examiner

*Primary Examiner* — Travis Hunnings
(74) *Attorney, Agent, or Firm* — Drinker Biddle & Reath LLP (57) ABSTRACT

In a numerical controller, alarm mask information is preset. The alarm mask information is compared with alarm factor information generated by any of control circuits, and depending on a comparison result, an alarm is masked so as not to be delivered to a central processing unit. Thus, depending on the type of the alarm factor information, delivery of an alarm to the central processing unit is omitted when processing need not be stopped.

4 Claims, 6 Drawing Sheets

NUMERICAL CONTROLLER

RELATED APPLICATION DATA

This application claims priority under 35 U.S.C. §119 and/or §365 to Japanese Application No. 2014-047860 filed Mar. 11, 2014, the entire contents is incorporated herein by reference.

BACKGROUND OF THE INVENTION

1. Field of the Invention

The present invention relates to a numerical controller that enables a method for alarm notification to be changed depending on the type of an abnormality at the time of access to a device or a memory.

2. Description of the Related Art

A numerical controller used to control a machine tool includes a central processing unit (CPU) for operations, a memory in which an OS and the like are stored, a memory control circuit that controls the memory, an axis control circuit that controls axes, and a display control circuit for display.

Figure 5:
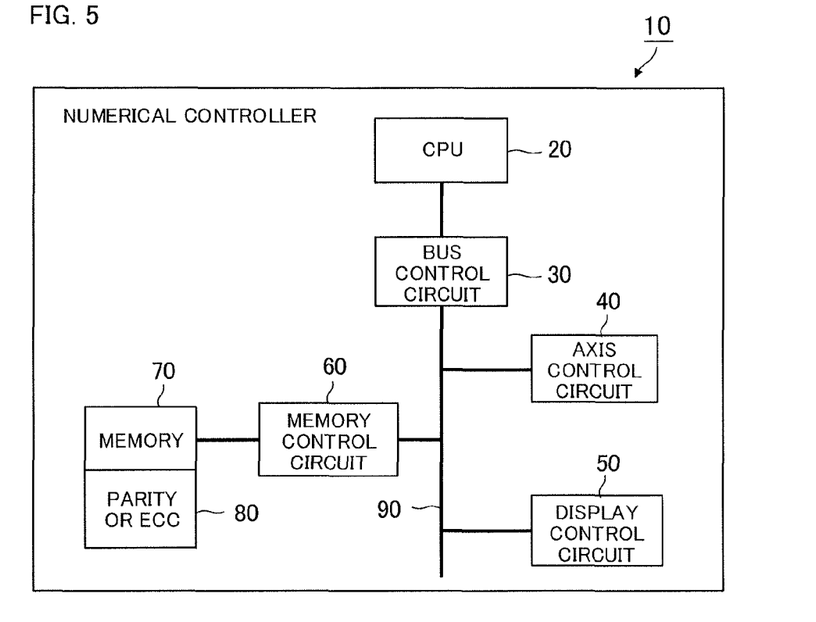
FIG. 5 is a diagram depicting a configuration of a conventional numerical controller.

A configuration of a conventional numerical controller will be described with reference to FIG. 5.

A numerical controller 10 is internally provided with a CPU 20, a bus control circuit 30 that controls a bus, an axis control circuit 40 that controls an axis, a display control circuit 50 that controls a display apparatus, a memory 70, and a memory control circuit 60 used to control the memory 70. Data for data abnormality detection 80 (parity data or ECC) is stored in the memory 70. Furthermore, the axis control circuit 40, the display control circuit 50, the memory control circuit 60, and the memory 70 are connected together via a bus 90. The bus 90 is controlled by the bus control circuit 30. Moreover, the CPU 20 and the bus 90 are connected together via a bus connection circuit (not depicted in the drawings).

Figure 6:
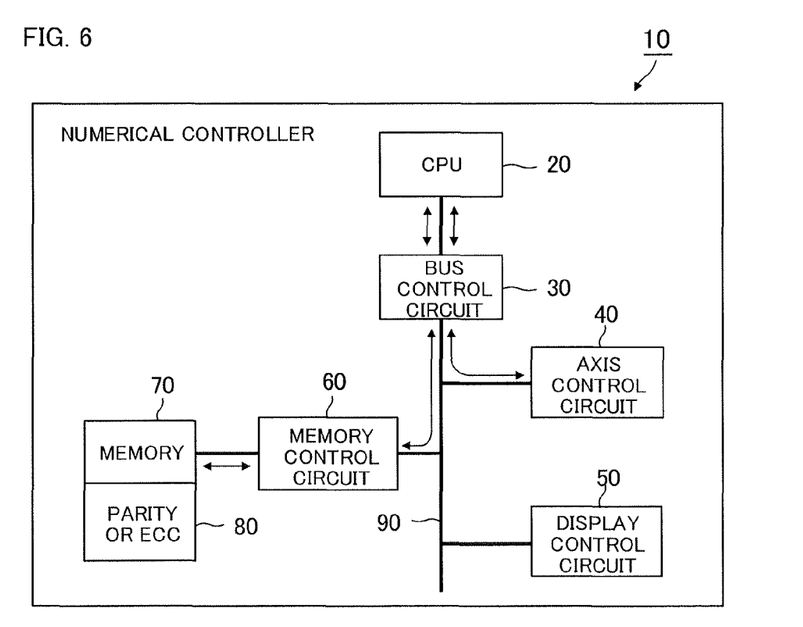
FIG. 6 is a diagram depicting exchange of signals during an axis control process in the numerical controller in FIG. 5.

Exchange of signals during an axis control process in the numerical controller 10 in FIG. 5 will be described using FIG. 6.

The CPU 20 exchanges signals with the bus control circuit 30 to acquire data in the memory 70 from the bus control circuit 30 through the memory control circuit 60 to control axes (not depicted in the drawings) through the axis control circuit 40.

Figure 7:
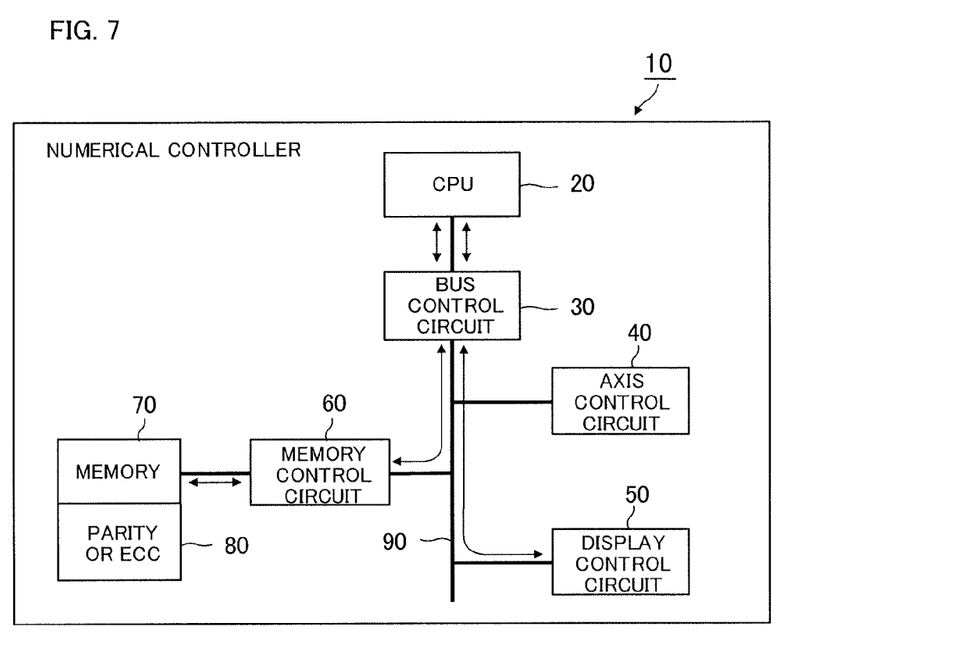
FIG. 7 is a diagram depicting exchange of signals during a display control process in the numerical controller in FIG. 5.

Exchange of signals in the numerical controller in FIG. 5 during a process of controlling a display apparatus will be described using FIG. 7.

The CPU 20 exchanges signals with the bus control circuit 30 to acquire data in the memory 70 from the bus control circuit 30 through the memory control circuit 60 to control the display apparatus (not depicted in the drawings) through the display control circuit 50.

Figure 8:
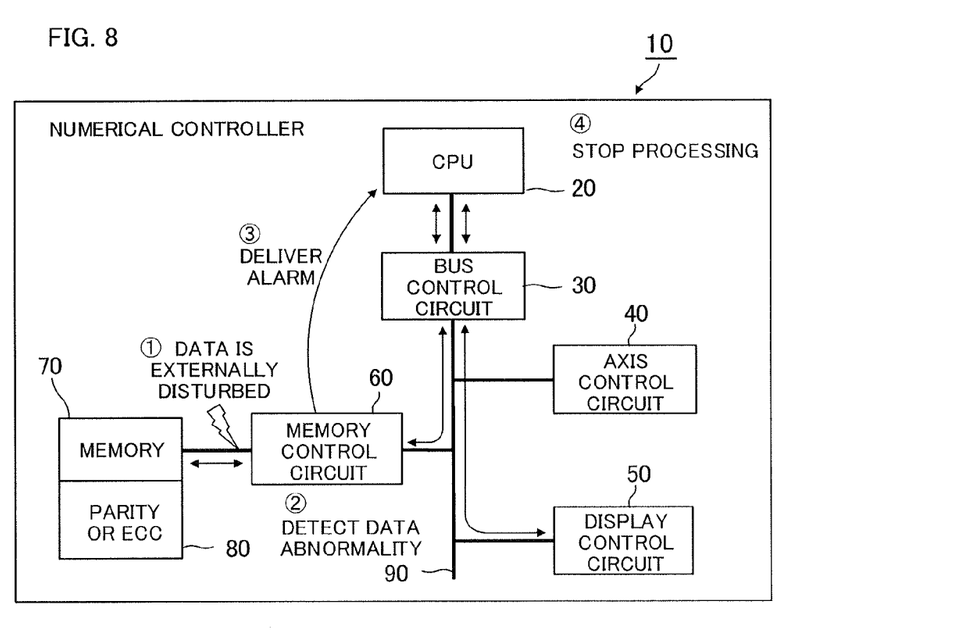
FIG. 8 is a diagram depicting processing executed in the numerical controller in FIG. 5 when data in the memory is abnormal.

In this regard, the data for data abnormality detection 80 in the memory 70 is monitored by the memory control circuit 60. If the memory control circuit 60 detects an abnormality in the data in the memory 70, the memory control circuit 60 delivers an alarm to the CPU 20. FIG. 8 depicts processing executed at the time of a data abnormality in the memory 70. As is the case with a state depicted in FIG. 7, when data is externally disturbed during a display control process, the memory control circuit 60 detects an abnormality in the data and delivers an alarm to the CPU 20. Upon receiving the alarm, the CPU 20 stops processing.

Furthermore, like the memory 70, the bus 90, which allows for access to the memory or device, is provided with data for data abnormality detection. Each control circuit monitors received data for abnormality, and if an abnormality is detected, the control circuit delivers an alarm to the CPU 20. Upon receiving the alarm, the CPU 20 stops processing.

Figure 9:
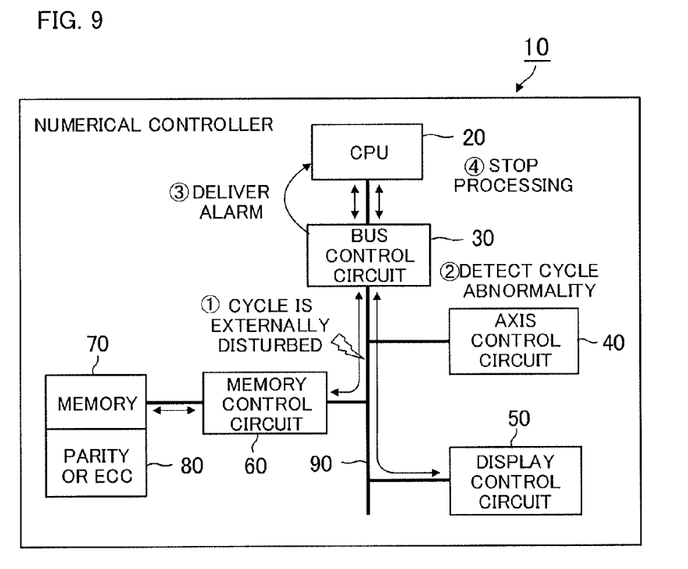
FIG. 9 is a diagram depicting processing executed when a cycle abnormality occurs while a display control circuit in the numerical controller in FIG. 5 is executing a process of controlling the display apparatus.

Moreover, the bus control circuit 30 has a function to monitor the cycle time of the bus 90, and also delivers an alarm to the CPU 20 if an abnormality is detected such as no response to access to any of the control circuits. FIG. 9 depicts such a state. When the cycle of the bus 90 is externally disturbed during a process of controlling the display apparatus, the bus control circuit 30 detects a cycle abnormality and delivers an alarm to the CPU 20. Upon receiving the alarm, the CPU 20 stops the processing.

Figure 10:
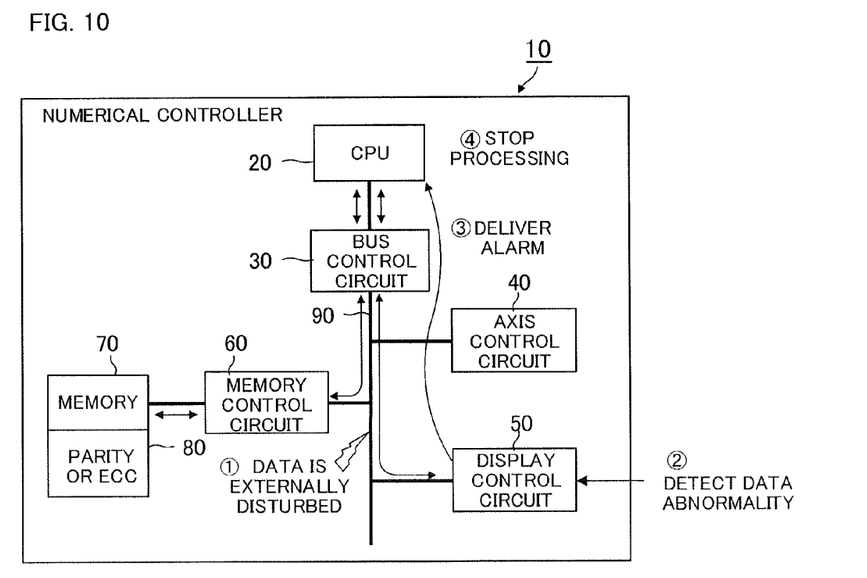
FIG. 10 is a diagram depicting processing executed when a data abnormality occurs while the display control circuit in the numerical controller in FIG. 5 is executing a process of controlling the display apparatus.

Furthermore, each of the control circuits has a function to check data from the bus 90, and upon detecting an abnormality in the data received from the bus 90, delivers an alarm to the CPU 20. FIG. 10 depicts such a state. When the data from the bus 90 is externally disturbed during a process of controlling the display apparatus, the display control circuit 50 detects an abnormality in the data and delivers an alarm to the CPU 20. Upon receiving the alarm, the CPU 20 stops processing.

As described above, a conventional machine tool stops processing when any of the control circuits delivers an alarm to the CPU 20. This is carried out for safety concern because, when the axes perform an unexpected operation due to malfunction, the machine may be damaged or an accident may occur.

Japanese Patent Application Laid-Open No. 2009-104246 discloses a technique in which an operating status is determined in a CPU module for PLC determines, and when an abnormal state is detected, the CPU module for PLC is shut down, and when subsequently determined that the abnormality is temporary, the CPU module for PLC is restarted using restart means.

In conventional techniques, whatever abnormality occurs, any of the control circuits delivers an alarm to the CPU 20 to cause the CPU 20 to stop processing. In this regard, in a machine tool controlled by the numerical controller, when processing is stopped before completion, a time loss occurs as a result of restarting and the like. Furthermore, when processing is stopped during machining, a machined surface may be affected by the stoppage, leading to a loss in material. In particular, in machining of molds or the like, machining of one mold may need several hours. Thus, when the machining is stopped before completion, a significant temporal loss may occur.

Even in the technique disclosed in Japanese Patent Application Laid-Open No. 2009-104246, the CPU module for PLC is restarted when the abnormality is determined to be temporary, but the processing is temporarily stopped when the abnormality occurs. Thus, a loss in time or material may result from the stoppage of the processing as is the case with the conventional techniques.

SUMMARY OF THE INVENTION

Thus, an object of the present invention is to provide a numerical controller that enables a reduction in the occurrence probability of stoppage of processing resulting from an abnormality.

A numerical controller according to the present invention has a central processing unit (CPU), a memory, a memory control circuit that controls the memory, an axis control circuit that controls axes, a display control circuit that controls display, a system bus, a bus control circuit that controls the system bus, and a determination section in which alarm mask information is preset. The system bus connects the memory control circuit, the axis control circuit, the display control circuit, and the bus control circuit together. The determination section is configured to execute a process of comparing the alarm mask information with alarm factor information output from any of the memory control circuit, the axis control circuit, the display control circuit, and the bus control circuit as a result of detection of an abnormality in data or a bus cycle, to provide masking so as to omit delivery of an alarm to the central processing unit depending on a comparison result.

In the numerical controller according to the present invention, the alarm mask information is preset in the determination section, and the preset alarm mask information is compared with the alarm factor information generated by any of the control circuits. Then, delivery of an alarm to the central processing unit is omitted depending on the comparison result. Thus, depending on the type of the alarm factor information, delivery of an alarm to the central processing unit is omitted when processing need not be stopped. This enables a reduction in the occurrence probability of stoppage of processing.

The determination section may have a memory in which the alarm factor information output by the control circuit is recorded and execute a process of determining consecutiveness of abnormality occurrence based on the alarm factor information recorded in the memory and is configured to provide masking so as to omit delivery of an alarm to the central processing unit depending on a determination result.

In this aspect, the alarm factor information is recorded in the memory in the determination section to allow consecutiveness of abnormality occurrence to be determined. Thus, even when the abnormality is at a level where a single occurrence does not need stoppage of processing, if such an abnormality occurs consecutively, an alarm is delivered to the central processing unit to cause the central processing unit to stop processing. This enables more appropriate determination of whether the processing is to be continued or stopped depending on the abnormality.

When, during a display process executed by the display control circuit, an abnormality in data generated during the display process or an abnormality in the cycle of the bus occurs, the determination section may omit delivery of an alarm to the central processing unit and the display control circuit may execute a process of redisplaying a screen.

In this aspect, when an abnormality occurs while a display process is being executed by the display control circuit, a process of redisplaying the screen is executed to enable reliable display of an important message or the like.

When the determination section provides masking so as to omit delivery of an alarm to the central processing unit, the display control circuit may indicate, on the screen, that the alarm has been masked.

In this aspect, when the determination section provides masking so as to omit delivery of an alarm to the central processing unit, the screen indicates that the determination section has provided masking so as to omit delivery of an alarm to the central processing unit. This enables the operator to be notified that an abnormality has occurred even though the processing is being continuously executed.

The present invention can provide a numerical controller that enables a reduction in the occurrence probability of stoppage of processing resulting from an abnormality.

BRIEF DESCRIPTION OF THE DRAWINGS

The foregoing and other objects and features of the present invention will be apparent from description of embodiments with reference to the accompanied figures, in which.

DETAILED DESCRIPTION OF THE PREFERRED EMBODIMENTS

Figure 1:
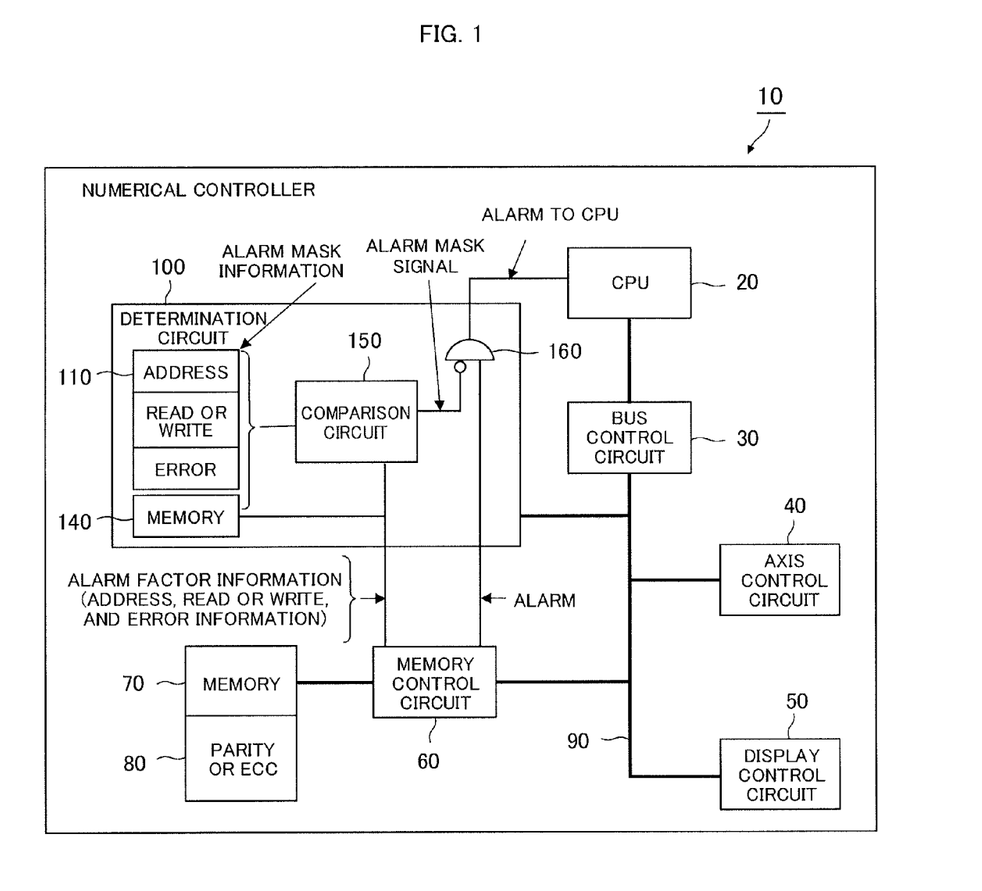
FIG. 1 is a diagram depicting a configuration of a numerical controller according to an embodiment of the present invention.

An embodiment of a numerical controller according to the present invention will be described using FIG. 1. Elements of the embodiment which are similar to corresponding elements of the conventional techniques are denoted by the same reference numerals, and description of the elements is omitted.

A numerical controller 10 includes a determination circuit 100. The determination circuit 100 includes an alarm mask information memory 110, an alarm factor information memory 140, a comparison circuit 150, and an alarm mask circuit 160. In the alarm mask information memory 110, addresses and data, read/write information, and contents of abnormalities (errors) for cycles for which alarms are neglected are preset. In the alarm factor information memory 140, alarm factor information (addresses, read/write, and error information) generated by control circuits (a bus control circuit 30, an axis control circuit 40, a display control circuit 50, and a memory control circuit 60) is stored.

When an abnormality in a memory 70, an abnormality in data from a bus 90, or a cycle abnormality in the bus 90 is detected, the control circuits including the bus control circuit 30, the axis control circuit 40, the display control circuit 50, or the memory control circuit 60 deliver alarm factor information and an alarm for the abnormality to the determination circuit 100. In the determination circuit 100, the alarm factor information is input to the comparison circuit 150, and the alarm is input to the alarm mask circuit 160. Furthermore, the alarm factor information is stored in the alarm factor information memory 140.

The comparison circuit 150 compares the alarm factor information transmitted by any of the control circuits with the addresses and data, the read/write information, and the contents of the errors for the cycles for which alarms are neglected, all of which are stored in the alarm mask information memory 110. Then, when the information stored in the alarm mask information memory 110 matches the alarm factor information transmitted by the control circuit, the comparison circuit 150 transmits an alarm mask signal to the alarm mask circuit 160.

The alarm mask circuit 160 performs a logical calculation on the alarm mask signal transmitted by the comparison circuit 150 and an alarm signal transmitted by the control circuit. When the alarm mask signal has been issued, the alarm mask circuit 160 executes a mask process so as to omit delivery of the alarm signal transmitted by the control circuit to the CPU 20.

Furthermore, the comparison circuit 150 also determines whether the alarm factor information recorded in the alarm factor information memory 140 has been consecutively recorded. When the alarm factor information has been consecutively recorded a predetermined number of times, the comparison circuit 150 transmits an alarm mask signal to the alarm mask circuit 160 to execute a mask process so as to omit delivery of the alarm signal transmitted by the control circuit to the CPU 20.

In this regard, when the axes of the machine tool perform an unexpected operation due to malfunction, the machine tool may be damaged or an accident may occur. Thus, when an abnormality occurs in the control of the axes, the processing needs to be stopped for safety concern.

On the other hand, if an abnormality in the memory 70, an abnormality in the bus 90, or an abnormality in the cycle of the bus 90 occurs, given that the abnormality is related to an axis control process, continuing the processing without any change may cause the axes to make unexpected motion. Thus, the processing needs to be stopped.

However, given that the abnormality is related to, for example, a display process, the abnormality does not affect the operation of the axes. Thus, there is no possibility that a situation occurs where the axes perform an unexpected operation to damage the machine tool or cause an accident.

In view of the above, processing not directly related to the control of the axes is stored in the alarm mask information memory 110. Examples of such information to be stored include position information. In a process of position display, the CPU 20 reads data in the position information stored in the memory 70, converts the data into display data, and writes the resultant data to the display control circuit 50. The series of operations is not directly related to the control of the axes even if the data or cycle is temporarily externally disturbed.

Thus, the following information is set to be stored in the alarm mask information memory 110.

A single occurrence of data abnormality during a read cycle in which the position information is loaded from the memory, A single occurrence of cycle abnormality during a read cycle in which the position information is loaded from the memory, A single occurrence of data abnormality during a write cycle in which converted display data is written to the display circuit, and A single occurrence of cycle abnormality during a write cycle in which converted display data is written to the display circuit.

Figure 2:
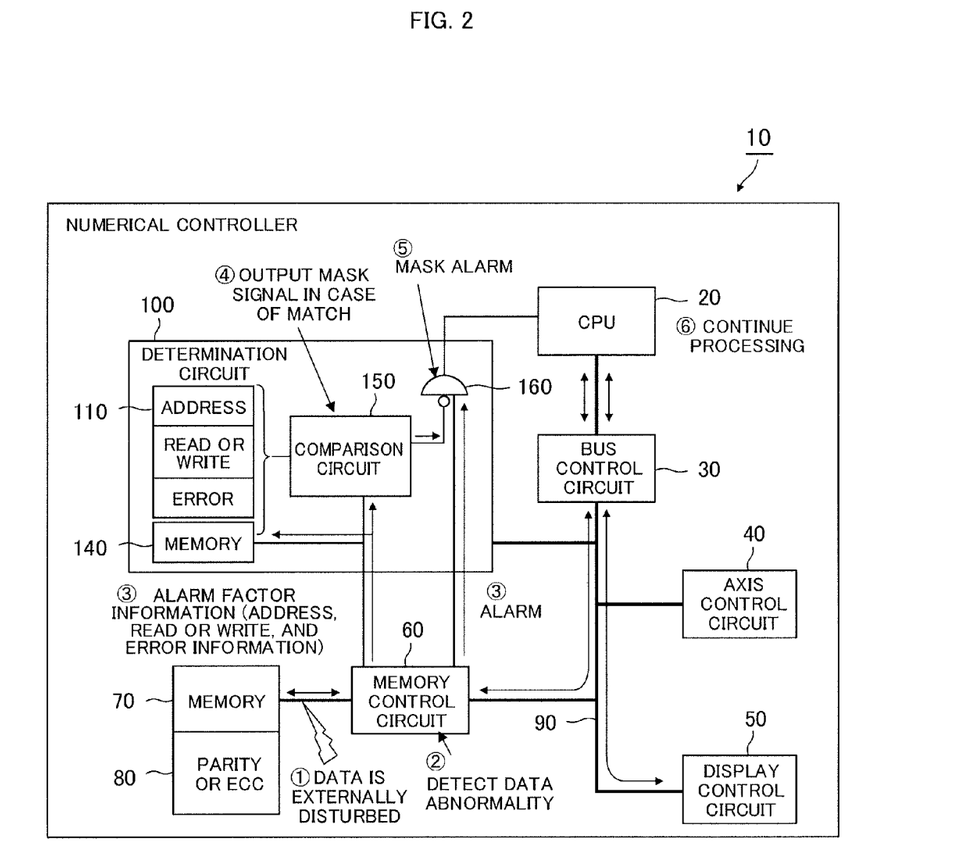
FIG. 2 is a diagram depicting processing executed in the numerical controller in FIG. 1 if a memory control circuit detects a data abnormality when data is loaded from a memory.

FIG. 2 is a diagram depicting processing executed if the memory control circuit 60 detects a data abnormality when data is loaded from the memory.

In accordance with a command from the CPU 20, the memory control circuit 60 carries out a read cycle on the memory 70. At this time, data loaded from the memory 70 may be externally disturbed. The external disturbance of the data is detected as a data abnormality when the memory control circuit 60 detects data for data abnormality detection 80.

Upon detecting the data abnormality, the memory control circuit 60 delivers an alarm and alarm factor information (an address, data, read/write information, the content of the abnormality, and the like) to the determination circuit 100. In the determination circuit 100, the alarm is received by the alarm mask circuit 160, and the alarm factor information is received by the comparison circuit 150.

Then, the determination circuit 100 writes the alarm factor information to the alarm factor information memory 140. The comparison circuit 150 compares the alarm factor information with an alarm negligible condition set in advance in the alarm mask information memory 110. When the alarm factor information matches the alarm negligible condition, the determination circuit 100 determines that the alarm factor information is negligible, and outputs an alarm mask signal to the alarm mask circuit 160. Then, the alarm mask circuit 160 masks the alarm to the CPU 20 based on the alarm mask signal transmitted by the comparison circuit 150. The CPU 20 then does not stop but continues processing.

Figure 3:
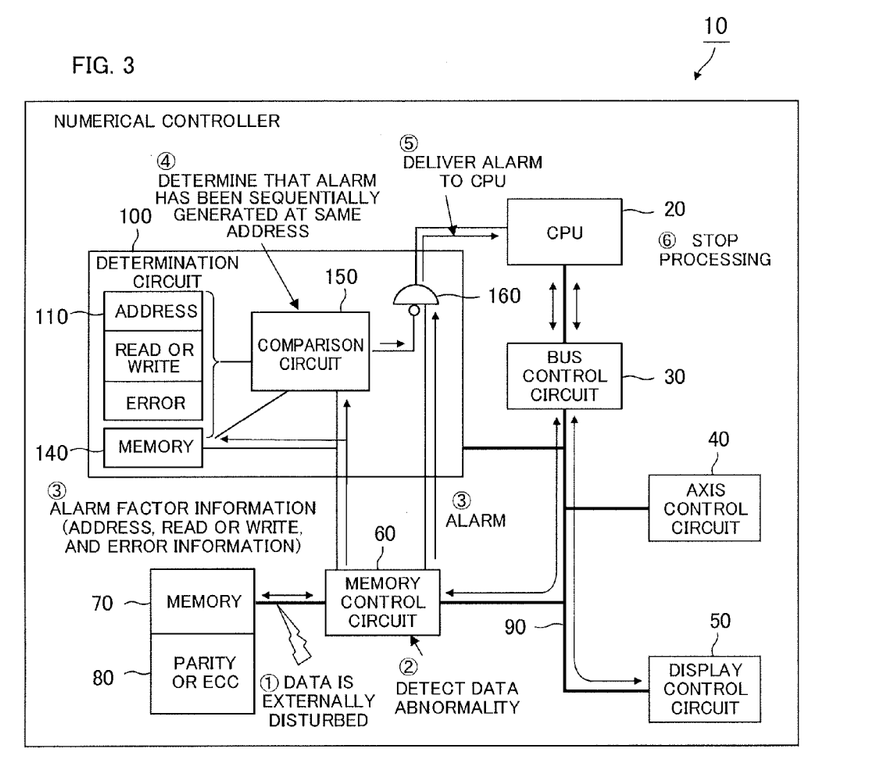
FIG. 3 is a diagram depicting processing executed in the numerical controller in FIG. 1 when an abnormality in the same cycle has occurred consecutively.

FIG. 3 is a diagram depicting an example of processing executed when the same cycle abnormality occurs consecutively at the same address.

As is the case with FIG. 2, in accordance with a command from the CPU 20, the memory control circuit 60 carries out a read cycle on the memory 70. At this time, data loaded from the memory 70 may be externally disturbed. The external disturbance of the data is detected as a data abnormality when the memory control circuit 60 detects the data for data abnormality detection 80.

Upon detecting the data abnormality, the memory control circuit 60 delivers an alarm and alarm factor information (an address, data, read/write information, the content of the abnormality, and the like) to the determination circuit 100. In the determination circuit 100, the alarm is received by the alarm mask circuit 160, and the alarm factor information is received by the comparison circuit 150.

Then, the determination circuit 100 writes the alarm factor information to the alarm factor information memory 140. The comparison circuit 150 checks the alarm information stored in the alarm factor information memory 140. Upon determining that the same error has occurred consecutively at the same address, the determination circuit 100 delivers an alarm to the CPU 20 through the alarm mask circuit 160 to cause the CPU 20 to stop processing.

The setting of the number of consecutive occurrences of the error allowed before the processing is stopped can be appropriately set depending on the type of the error. By way of example, for data abnormalities, the number of consecutive occurrences of the error allowed may be large if the data abnormality is only the leakage of bits. However, when the bus control circuit 30 monitors the cycle time of the bus 90, if access to any of the control circuits results in no response, an alarm is desirably delivered to the CPU 20 after the error has consecutively occurred a small number of times (for example, twice) to cause the CPU 20 to stop processing.

In FIG. 2 and FIG. 3, the examples have been described in which the alarm factor information from the memory control circuit 60 is transmitted to the determination circuit 100. However, these examples are merely for illustrative purposes, and the alarm factor information from any of the other circuits including the bus control circuit 30, the axis control circuit 40, and the display control circuit 50 is similarly transmitted to the determination circuit 100. The transmission of the alarm factor information from any of the other control circuits and the processing in the determination circuit 100 are similar to those in the case of the transmission of the alarm factor information from the memory control circuit 60, and will thus not be described below.

Furthermore, in the present embodiment, information concerning masking of an alarm is set in advance in the alarm mask information memory 110, and when the alarm factor information generated by any of the control circuits matches the set information concerning masking of an alarm, the alarm mask circuit 160 masks delivery of an alarm to the CPU 20. However, conversely, information concerning delivery of an alarm without masking may be set in the alarm mask information memory 110 so that, when the alarm factor information generated by any of the control circuits fails to match the set information concerning delivery of an alarm without masking, the alarm mask circuit 160 masks delivery of an alarm to the CPU 20.

Figure 4:
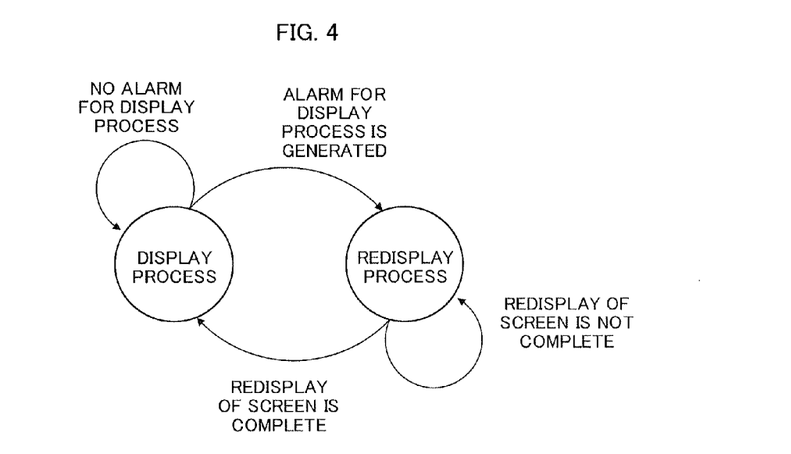
FIG. 4 is a diagram depicting an example of a redisplay process executed by a display apparatus when an alarm is generated.

Now, a redisplay process executed when an alarm is generated will be described. FIG. 4 is a diagram depicting an example of processing executed by the display apparatus when an alarm is generated during a display process.

The display process is cyclically executed to periodically update the screen. Thus, even if the data is temporarily disturbed, the screen is only temporarily disturbed, and update of the screen allows the disturbance to be eliminated. However, the display of an important message or the like may need to be reliably achieved.

As depicted in FIG. 4, when a display process executed by the display apparatus is not abnormal, the CPU 20 cyclically repeats the display process. When an abnormality occurs during the display process to generate an alarm, the display apparatus shifts to a redisplay process. The redisplay process is cyclically repeated until completion. After the redisplay of the entire screen is complete, the display apparatus returns to the display process. These processes are executed without stopping the processing executed by the machine tool.

The invention claimed is:

1. A numerical controller comprising:
a central processing unit (CPU);
a memory;
a memory control circuit that controls the memory;
an axis control circuit that controls axes;
a display control circuit that controls display;
a system bus;
a bus control circuit that controls the system bus; and
a determination section in which alarm mask information is preset,
the system bus connecting the memory control circuit, the axis control circuit, the display control circuit, and the bus control circuit together,
wherein the determination section is configured to execute a process of comparing the alarm mask information with alarm factor information output from any of the memory control circuit, the axis control circuit, the display control circuit, and the bus control circuit as a result of detection of an abnormality in data or a bus cycle, to provide masking so as to omit delivery of an alarm to the central processing unit depending on a comparison result.

2. The numerical controller according to claim 1, wherein the determination section has a memory in which the alarm factor information output by the control circuit is recorded and executes a process of determining consecutiveness of abnormality occurrence based on the alarm factor information recorded in the memory, and
is configured to provide masking so as to omit delivery of an alarm to the central processing unit depending on a determination result.

3. The numerical controller according to claim 1, wherein, when, during a display process executed by the display control circuit, an abnormality in data generated during the display process or an abnormality in the cycle of the bus occurs, the determination section omits delivery of an alarm to the central processing unit and the display control circuit executes a process of redisplaying a screen.

4. The numerical controller according to claim 1, wherein, when the determination section provides masking so as to omit delivery of an alarm to the central processing unit, the display control circuit indicates, on the screen, that the alarm has been masked.

* * * * *